(12) United States Patent
Swanburg et al.

(10) Patent No.: US 10,127,530 B1
(45) Date of Patent: Nov. 13, 2018

(54) UPDATING SERVICE LEVEL AGREEMENTS BASED ON A USAGE PATTERN FOR A SUBSCRIBER AT MULTIPLE LOCATIONS DURING MULTIPLE TIMES OF DAY

(75) Inventors: Scott Allen Swanburg, Duluth, GA (US); Gurmeet Kaur Bhatia, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 2424 days.

(21) Appl. No.: 11/934,145

(22) Filed: Nov. 2, 2007

(51) Int. Cl.
*G06Q 20/10* (2012.01)
*G06Q 20/12* (2012.01)

(52) U.S. Cl.
CPC ......... *G06Q 20/102* (2013.01); *G06Q 20/127* (2013.01)

(58) Field of Classification Search
USPC .............. 705/1.1, 300–348, 901–912, 80
See application file for complete search history.

(56) References Cited

U.S. PATENT DOCUMENTS

| | | | | |
|---|---|---|---|---|
| 6,947,738 B2* | 9/2005 | Skog et al. | ............ | 455/426.1 |
| 7,317,754 B1* | 1/2008 | Remy et al. | ............ | 375/222 |
| 2001/0018349 A1* | 8/2001 | Kinnunen | ............ | H04W 4/02 455/456.3 |
| 2002/0041590 A1* | 4/2002 | Donovan | ............ | 370/352 |
| 2002/0120540 A1* | 8/2002 | Kende et al. | ............ | 705/35 |
| 2003/0012136 A1* | 1/2003 | Walles | ............ | H04L 12/5601 370/229 |
| 2003/0125028 A1* | 7/2003 | Reynolds | ............ | 455/437 |
| 2004/0073569 A1* | 4/2004 | Knott | ............ | G06Q 30/02 |
| 2004/0199527 A1* | 10/2004 | Morain et al. | ............ | 707/100 |
| 2004/0205101 A1* | 10/2004 | Radhakrishnan | ............ | 709/200 |
| 2004/0242209 A1* | 12/2004 | Kruis et al. | ............ | 455/414.1 |
| 2004/0254819 A1* | 12/2004 | Halim et al. | ............ | 705/5 |
| 2005/0261062 A1* | 11/2005 | Lewin et al. | ............ | 463/42 |
| 2007/0239552 A1* | 10/2007 | Sundaresan | ............ | 705/26 |
| 2008/0027924 A1* | 1/2008 | Hamilton et al. | ............ | 707/5 |
| 2008/0250323 A1* | 10/2008 | Huff | ............ | 715/733 |

* cited by examiner

*Primary Examiner* — Paul R Fisher
(74) *Attorney, Agent, or Firm* — Hartman & Citrin LLC

(57) ABSTRACT

Systems and methods are presented to intelligently and seamlessly provide services to a mobile subscriber on a network based on the subscriber's usage of that or other services. A provisioning mechanism is presented that is able to correlate subscriber profiles with a plurality of Service Level Agreements (SLA) in order to intelligently determine optimal service levels. A logic unit on a network distinguishes usage patterns for a subscriber of a service, correlates the usage patterns with an SLA related to the service, and optimizes the service by modifying the SLA to reflect the usage patterns of the subscriber. Usage patterns for multiple subscribers can be correlated and stored in a segment profile. The segment profile sheds further light on what quality, level, and type of service the subscriber will find relevant. This helps maintain efficient network usage while increasing subscriber satisfaction with their level of service.

18 Claims, 7 Drawing Sheets

UPDATING SERVICE LEVEL AGREEMENTS BASED ON A USAGE PATTERN FOR A SUBSCRIBER AT MULTIPLE LOCATIONS DURING MULTIPLE TIMES OF DAY

BACKGROUND OF THE INVENTION

Field of the Invention

The present invention relates generally to service provisioning. More particularly, the present invention relates to optimally provisioning relevant services for subscribers on a network.

Background of the Invention

Mobile subscribers are increasingly using their mobile devices for more than just conversations. The advent of wireless data plans means that subscribers now have access to resources that were previously available only on the Internet. These resources are vast, and include but are not limited to email, web sites, images, audio, video, news, live transmissions, maps, etc. This plethora of services revolves around sophisticated, interactive applications provided by server subsystems that enable subscribers to have access to one or more applications quickly and simultaneously, as well as toggle between such multiple applications with minimal effort. In addition there is increasing bandwidth available to subscribers at lower costs, as well as recent improvements in server technology and communication utilizing the packet-based IP Multimedia System and Session Initiation Protocol. These technological advances allow the subscribers to choose between numerous applications and services.

While subscribers have access to all these applications and services, they are limited in their ability and flexibility to launch applications and services at will. In addition subscribers are not given the opportunity to optimize those services based on embedded network operator intelligence and are constantly pushed services and applications that may not meet their desires nor are optimized for their intended use. Currently a subscriber can enable or "provision" a new service or application through talking directly with the network operator, from the internet or perhaps from the mobile device itself. However, there is usually a lag time between the request for the new application or service and when the request is fulfilled. Furthermore, the service and application are usually not optimized for the subscriber's needs. A data connection having a high upload bandwidth may not be optimal for a subscriber who regularly watches streaming TV. However, it may be optimal for a business user who sends attachments via email or live video via teleconference. Since the provider of the service lacks sufficient information about the subscriber's usage, the subscriber is left with the default application or the standard quality of service (QoS) for the new service that was recently acquired. Furthermore, mobile service providers do not push new services and applications that are optimized to an individual user's needs.

In addition, subscribers have expectations based on a certain level of performance for individual services as well as combined and interactive services. For instance, in a communications service such as voice or video, there is an expectation for continuous use with minimal disruption of service. Subscribers may want differing qualities of service for the same service, such as video conferencing, depending on the subscriber's different uses of the service. At present, to upgrade to a higher-bandwidth data connection or to access a new service, the subscriber has to manually request the service to be provisioned. Then the Service Level Agreement (SLA) is added to the subscriber's account, and he his billed for that month of usage of the service. If the subscriber finds out that the service is not ideally configured, he may stop using it but is still billed for the service, until he manually de-provisions the service.

This model does not work very efficiently for the plethora of services and related service levels offered today. What is needed is a system that will provide real-time automated access to new services and applications where the services and applications have been optimized based on the subscriber's needs.

SUMMARY OF THE INVENTION

The present invention discloses methods and systems for a provisioning mechanism that is connected to usage profiles, a multiplicity of Service Level Agreements (SLA) and will also support both family oriented usage as well as enterprise usage all on the same device. The profile/usage porting function is one in which the User Experience is captured and stored at the network Intelligent Information Collection Repository (IICR) and through periodic downloads from the device Micro IICR. Provisioning then takes place in the back office based on these usage patterns but also allows for the flexibility of subscriber initiated applications downloads and subsequent optimization.

In one exemplary embodiment, the present invention discloses systems and methods for a provisioning mechanism that is able to correlate subscriber profiles with a plurality of Service Level Agreements (SLA) in order to intelligently determine optimal service levels. A logic unit on a network distinguishes usage patterns for a subscriber of a service, correlates the usage patterns with an SLA related to the service, and optimizes the service by modifying the SLA to reflect the usage patterns. The subscriber may be billed an additional amount if a premium service level is provisioned. The subscriber may or may not be alerted as to whether his confirmation is required to update the service level.

In another embodiment, the present invention discloses methods and systems for providing new or additional services for a mobile subscriber. A provisioning mechanism is connected to application servers, billing servers, and an IICR. The provisioning mechanism is also able to retrieve subscriber profiles from the IICR and corresponding SLAs for the subscriber. A logic unit within the provisioning mechanism detects patterns of usage in the subscriber profile, correlates these patterns with the SLAs, and can determine whether or not a particular subscriber has a need for a new or improved service. If a new service is available and relevant to the subscriber's needs, then it may be automatically provisioned to the subscriber's account and a new SLA is created.

In another exemplary embodiment, the methods and systems include the ability to remove SLA's and de-provision services that may no longer be relevant or useful for a subscriber. This determination is made by monitoring the subscriber's profile in the IICR, and may be performed automatically, at fixed intervals, or at the subscriber's request.

In another exemplary embodiment, the present invention discloses systems and methods for providing services and applications to a plurality of subscribers, based on common patterns of usage in the subscribers' profiles. An IICR amasses usage information for a plurality of subscribers.

Patterns of usage can be formed for multiple subscribers. Subscribers with similar usage patterns can be combined into a segmentation layer or segment. Popular applications within a segment can be "pushed" or recommended to individual subscribers or related segments. The SLAs for these subscribers may be modified automatically, or upon the subscriber's confirmation.

In another exemplary embodiment, the provisioning mechanism updates subscriber's SLA in real-time, based on information currently available within the IICR. The logic unit within the provisioning mechanism monitors the IICR in real time and makes changes to the subscriber's SLA based on changes in the IICR. Recognizing usage patterns enables the provisioning mechanism to predict when and how the SLA is to be modified without having to constantly refer to the IICR. This allows a service provider to dedicate optimal resources of an application server to those who need them the most. This also provides for efficient billing and charging of subscribers.

DETAILED DESCRIPTION OF THE INVENTION

The present invention discloses systems and methods for provisioning comprising a provisioning mechanism that is able to correlate subscriber profiles with a plurality of Service Level Agreements (SLA) in order to intelligently determine optimal service levels. A logic unit on a network distinguishes usage patterns for a subscriber of a service, correlates the usage patterns with an SLA related to the service, and optimizes the service by modifying the SLA to reflect the usage patterns of the subscriber.

Figure 1:
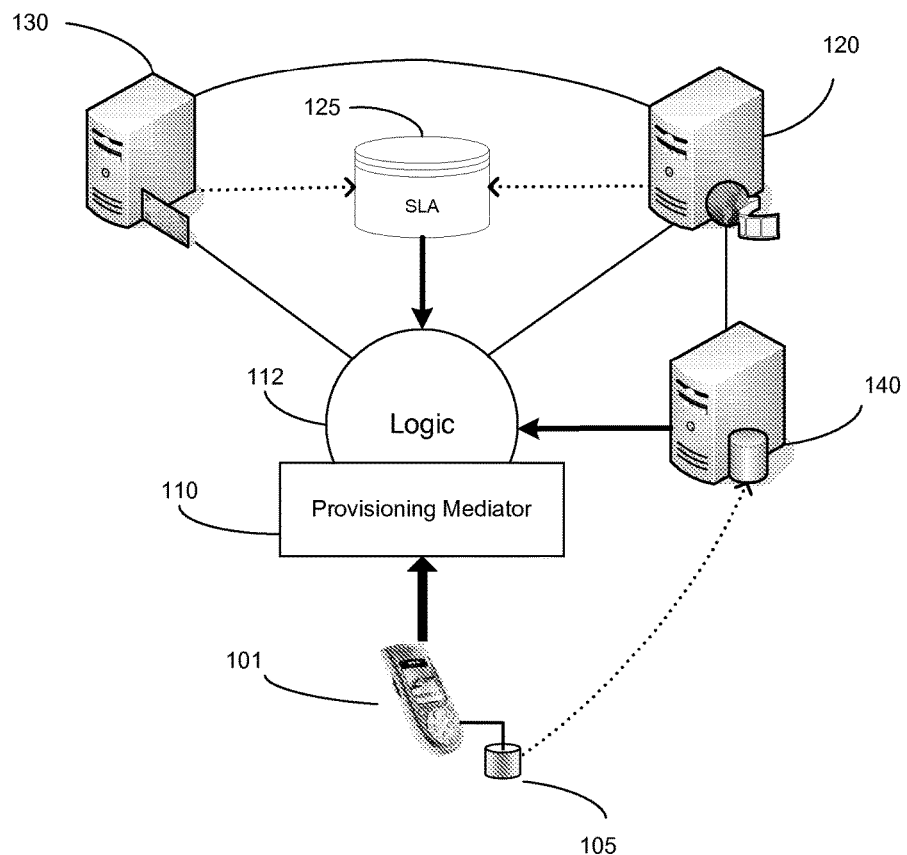
FIG. 1 shows a provisioning mechanism on a network, according to an exemplary embodiment of the present invention.

FIG. 1 shows a provisioning mechanism on a network, according to an exemplary embodiment of the present invention. A subscriber's device 101 is in communication with a provisioning mediator 110 via network. Provisioning logic 112 is a part of provisioning mediator 110, and is in communication with application server 120 and billing server 130. Furthermore, provisioning logic 112 can access SLA database 125, and Intelligent Information Collection Repository (IICR) 140. These network elements may comprise either hardware, computer programs, or any combination of both. "Provisioning logic" or "logic unit" likewise comprises a preprogrammed hardware unit, software, or a combination of both. Communication between network elements and logic units may include SIP, as well as any equivalent packet-based signaling and/or transport protocols.

A multitude of services are available to a subscriber. "Services" include voice, data, applications, etc. A service that is an application may be hosted by application server 120. Services can also include data services such as web browsing, FTP, and Instant Messaging (IM). Furthermore, a service may include access to particular network or transport protocols and elements, such as EVDO, SIP, etc. Services are provided by a "service provider." Service providers may be the network operators, or alternatively they may be third parties that contract with the network operator to be able to host their services on the network operator's network.

The process by which a subscriber enables access to a service is called "provisioning." A subscriber requests a service to be added. The request is handled by a provisioning gateway. One method of provisioning a service is manually, for instance via device 101. Provisioning may also be performed via a separate device such as a computer, or even directly by the network operator. Thus, "provisioning gateway" encompasses a plurality of methods to enable a service that will be known to one in the art.

The subscriber accesses provisioned services via a device 101. "Device" comprises any combination of cellular, mobile or satellite telephones ("phones"), personal computers, PDAs, or any equivalent device that is capable of wired or wireless communication over a packet-based network. For instance, the subscriber may surf the internet via a data connection on his mobile phone, or by tethering his mobile phone to his laptop computer, thus using the phone as a modem. Furthermore, the subscriber may access a multitude of services, including applications, multimedia, and associated network-level services and protocols. For instance, the subscriber may access an online banking application hosted by application server 120, as well as utilize a data-layer protocol such as 3 GP to watch video over his device.

Different services have varying levels of service. The "level of service," "service level," or "performance level" can comprise the quality, scope, and accessibility of the service but is not limited to these aspects. An example of quality could be voice quality; e.g., a subscriber may require a 16-bit high quality digital voice connection for videoconferencing purposes while another subscriber may only require an 8-bit connection for basic voice over internet protocol (VoIP) communication. Unlimited text messaging vs. a limited plan is an example of scope. The ability of a subscriber or a device to access certain applications or media resources is an example of accessibility. Subscribers typically pick and choose services based on their needs, then pay or are billed for these services. Thus, the agreed-upon level of service for a particular service is called a Service Level Agreement (SLA). SLAs are key to performance criteria of applications and services on the network. Customers have expectations based on a certain level of performance for individual services as well as combined and interactive services. For instance, in a communications service such as voice or video, there is an expectation for continuous use with minimal disruption of service. These services can be characterized as real-time and near real-time. Other services such as messaging may function with a certain amount of latency with no significant impact to the customer expectation. Thus, there can be numerous levels of SLAs for a particular service, each level corresponding to a different level of service. In addition, all of the various SLA agreements for the different services provided by the network operator comprise a subscriber SLA.

SLA database 125 stores this information for the subscriber. Based on the subscriber agreement with the network operator or with the service provider, SLA database 125 is modified by any combination of application server 120 and billing server 130. SLA database 125 contains records relating to customer's expectations of service level and quality of service (QoS), as well as records relating to actual delivered service levels and QoS. When application server 120 is accessed by device 101, a data link may be established between these two elements. As described herein, this data link is susceptible to variances in quality and scope. QoS is monitored by application server 120, and patterns of QoS are stored in the related SLA. For instance, the subscriber may have a data plan, and may have provisioned his account to receive daily video news feeds on his device. However, the quality of the video delivered 5 days out of 10 is lower than expected. The record of the actual quality and scope of the service is recorded in the SLA database 125 along with the subscriber's actual preference for the material. Thus, it is possible to compare expected service levels with actual service levels. This information could be useful when attempting to automatically determine the appropriate level of service for a subscriber.

To be able to adjust SLAs, provisioning logic 112 is also able to access records within IICR 140. IICR 140 stores patterns of usage data in a subscriber profile. The IICR 140 draws information from multiple sources in order to maintain usage patterns. Typically, a subscriber performs an action such as executing a particular application. This action is recorded by the respective application server 120 and is submitted to the IICR 140. Along with other similar usage information, IICR 140 creates subscriber profiles in real time based on information available in a network as well as information generated by service usage on device 101. This information can come from a subscriber's interaction with the network, with applications on a subscriber's mobile device, or from any other source, and includes but is not limited to usage patterns, purchases via a mobile device, billing, web browsing habits, song/video downloads/purchases, subscriber location, subscriber-defined preferences, as well as peak usage dates and times, protocols used, as well as similar information from other mobile subscribers' profiles. Subscribers may also be grouped into segments based on common usage data. This concept is explained further in FIG. 5. Optionally, a Micro IICR (MIICR) 105 may store information local to a device 101 and periodically upload the information to the network IICR 140. MIICR 105 augments the subscriber's profile that is typically generated by network-level IICR 140. MIICR 105 may be incorporated into a mobile device, or is placed anywhere on the network. MIICR 105 monitors several inputs for new information such as usage, application interaction, etc., and generates a sub-profile for the subscriber. This sub-profile may be used in conjunction with the subscriber profile generated by the IICR 140. Thus, the MIICR 105 performs at the user level many tasks that the IICR 140 would perform at the network level.

Provisioning logic unit 112 correlates the usage patterns in IICR 140 with the appropriate SLA related to the service. As mentioned herein, IICR 140 contains usage records of subscribers, as well as groups of subscribers known as segments. Patterns in these usage records may be applied to determine whether or not a certain subscriber or segment has a need for a particular application. If a subscriber drives daily from Fredericksburg, Va. to Alexandria, Va., while listening to internet radio in his car, this information will be in the IICR 140. Logic unit 112 recognizes this pattern, and looks for other services that could be added to the subscriber account based on information from the SLA database 125 and the IICR 140. For instance, logic unit 112 may decide that services such as mapping, traffic reports, or weather reports in the local area are optimal for the subscriber. The provisioning mechanism upgrades the subscriber's account by adding an SLA related to traffic or weather reports. The upgrade could comprise a modification to the existing Internet Radio SLA to deliver extra channels to the subscriber's device. This could be an example of scope of service. Alternatively the provisioning mechanism could "push" to subscriber 101 a series of options relating to weather and traffic reports for the area. The subscriber could view this "grocery list" of options and pick one that he or she likes. The service is then automatically provisioned and the subscriber sits back and enjoys his new information. Many more examples are provided in FIG. 7.

The subscriber may be part of one or more segments of subscribers or "segmentation layers," within the IICR. A segmentation layer would be formed of multiple subscribers that have one or more correlations between their usage patterns, services used, billing, demographics, etc. For instance, subscribers that were above the age of 60 and had services that allowed for access to bank and investment information would constitute a segmentation layer of subscribers. Another segmentation layer would be subscribers that have broad band service and download music. A more discrete segmentation layer could potentially comprise subscribers that live in Reston, Va. and commute to Washington, D.C. between 7 am and 9 am. An even more discrete segmentation layer could comprise the above commuters, but only those who own PocketPC™ devices and have unlimited-data plans.

Figure 2:
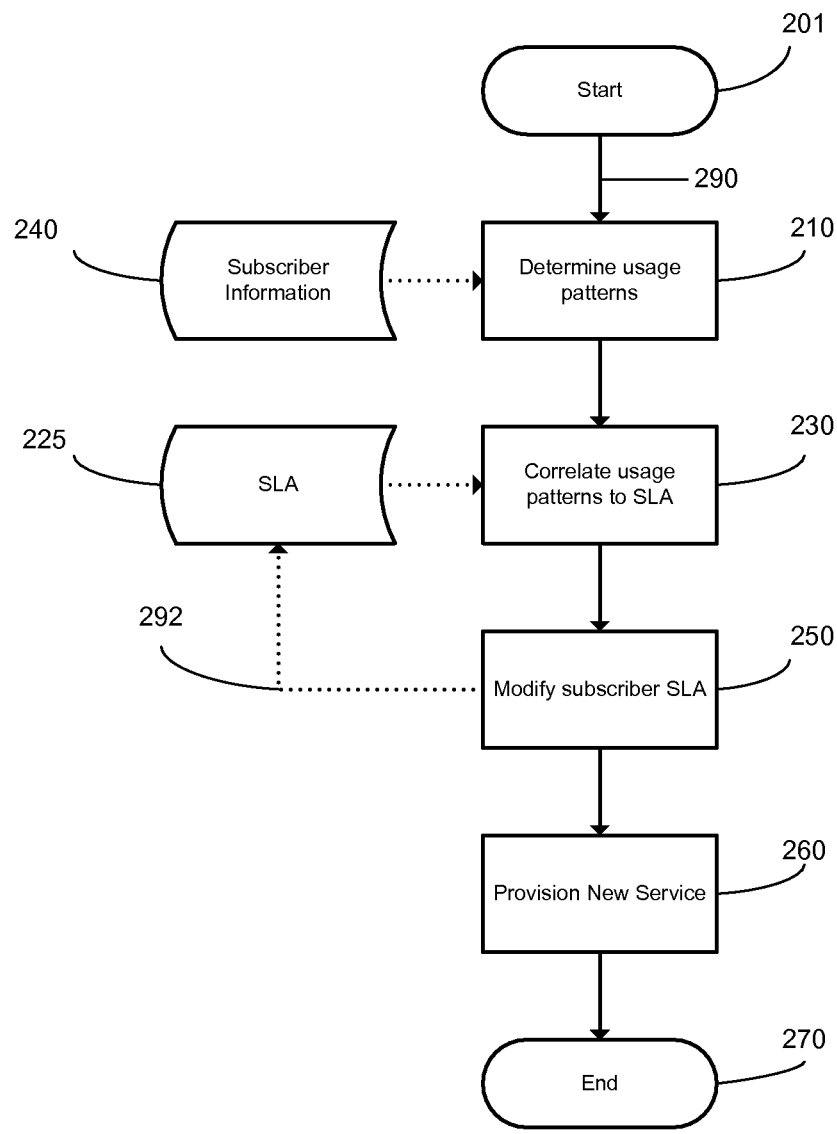
FIG. 2 shows a flow chart that describes the steps of the provisioning mechanism, according to an exemplary embodiment of the present invention.

FIG. 2 shows a flow chart outlining a provisioning mechanism, according to an exemplary embodiment of the present invention. The provisioning process starts 201 when any number of events occurs. For example, an event could be when subscriber James submits a request for a new service. This new service would update James' profile in the IICR to account for usage of the new service. The changing of the subscriber profile could also start 201 the provisioning mechanism as the network operator could identify new services and application needs for the subscriber. For example, if James submitted a request for a banking application, the application would be provisioned and the optimization process begins. James might now have a need for additional applications that complement the banking application and the provisioning mechanism would start 201 again and push the additional application to the subscriber.

The network operator may also initiate 201 the provisioning mechanism on a scheduled basis, for instance daily, weekly or yearly. In addition the start 201 of the provisioning mechanism could be triggered by a change in the usage patterns of the subscriber stored in the IICR.

Once the provisioning mechanism has started 201 for a service, a logic unit within the provisioning mechanism tries to intelligently determine what the usage pattern 210 will be of the subscriber. This logic uses the subscriber's information 240 that is collected from various sources including the IICR, MIICR, the SLA database and the billing database. The mechanism then intelligently processes the information to determine a usage pattern 210. For instance, if James has a banking application and makes money transfers of the same amount to a separate account on a bi-weekly basis, the mechanism could determine that James has a need for automatic transfer of funds. This could be a new service, or a heightened service level within the same SLA.

After determining the usage pattern of the subscriber, the provisioning logic correlates the usage pattern with the optimal SLA 230. The provisioning logic uses the SLA database 225 to determine the number of service level agreements available for a desired service. The logic then intelligently determines 230 the optimal SLA for the desired service or the optimal SLA for a particular use of the service. For instance, James may have a banking application only for personal use and only needs the lowest SLA to access his account information and check his balances. In this case the provisioning logic would assign James to the lowest SLA level. In another case James may use the banking application at work and at home. James' physical location is, of course, updated in the IICR in real-time. The provisioning logic may then determine that James only needs the lower SLA level at home because of his limited usage of the application there. While at work James uses all the facets of the application, the logic would assign a higher SLA level because of his usage pattern. Thus James has the optimal SLA for the service or optimal SLA's for the specific features of the service he uses.

In the event that there is no information about the subscriber that would relate to determining the optimal SLA for a new service, a default SLA determined by the network operator would be used. This is only likely to happen when the subscriber is setting up services for the first time with the network operator.

Once the optimal SLA is determined, the provisioning mechanism then modifies the subscriber SLA 250. If the service is new and there is no prior SLA, the mechanism will simply add the SLA to the subscriber SLA in SLA database 225. In the event that there is an existing SLA that is being replaced by the new SLA, the existing SLA will be torn down by the mechanism and replaced by the new SLA in SLA database 225. For example, James could have the lowest SLA for the banking application. Based on his most recent usage, the provisioning logic determines that James needs a higher SLA for his use at home and needs a new SLA, at the highest level, for use of the application at his work. The logic would seek to inactivate the existing lowest level SLA and replace it with the higher level SLA for use of the application at home. In addition, the provisioning mechanism would add the new highest SLA to SLA database 225. Having determined optimal SLA 230 and updating SLA 250 in SLA database 225, the provisioning mechanism will then provision the service 260 granting access to new service according to the new SLAs.

It should be apparent to one skilled in the art that the steps described above are not the only steps performed in execution of the present invention. Other steps may be involved that are not disclosed but which would be apparent to one having ordinary skill in the art after consideration of the present application. Additionally, other network elements known to those skilled in the art may be implicit in this disclosure, for instance, Home Location Registry (HLR), Proxy Resource and Authentication Center (PRAC), as well as other IP Multimedia System (IMS) elements and related telecommunications network elements.

Figure 3:
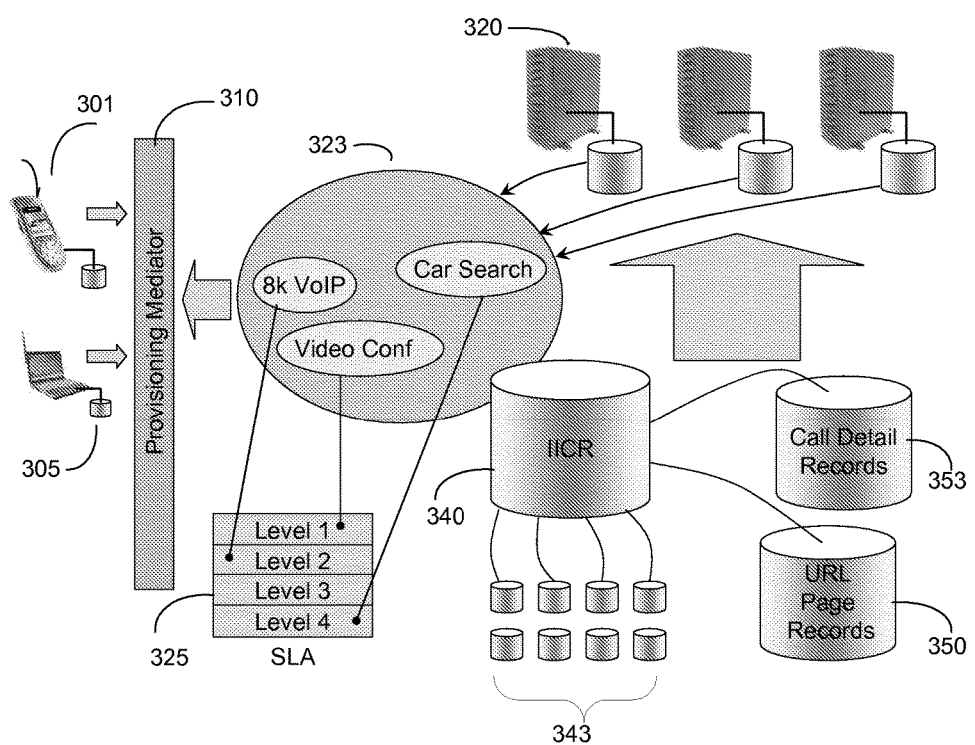
FIG. 3 shows a setup for intelligent provisioning, according to an exemplary embodiment of the present invention.

FIG. 3 shows a setup for intelligent provisioning, according to an exemplary embodiment of the present invention. Mobile devices 301, 305 are in communication with provisioning mediator 310. Provisioning mediator 310 contains a logic unit that is in communication with a plurality of application servers 320 and IICR 340. Application servers 320 host applications or services 323. Furthermore, each subscriber to a service has an expectation for scope of service and QoS, which are stored in the form of service level agreements (SLA) 325. IICR 340 stores a number of profiles 343 for individual subscribers. IICR 340 receives this information from a plurality of sources. M-IICR 305 within device 301 collects local usage data and forwards periodically to IICR 340. In this embodiment, two of these sources are existing Call Records from the CDR database 353 and Web surfing usage patterns from the URL page look up records database 350. The information in the profiles can be analyzed and assimilated into Usage Patterns that are stored on subscriber profiles.

In order to provide full customization of applications/services a hierarchical approach must be used which includes the ability to automatically recognize communities of subscribers or "segmentation layers" within IICR 340, and update SLAs 325 accordingly. Using profiling and feedback loops from mobile devices 301, this system will enable real-time provisioning and support for services 323 aligned with the current needs of the subscribers or communities/segments. For instance, a subscriber (James) may have use for a collaborative mobile video whiteboard application in order to communicate in a business environment while on business travel. However, this business travel occurs once every six months. The voice quality connection, video fidelity and access to whiteboarding tools may be critical for James at that particular time which requires the highest level of SLA 325 within the SLA for videoconferencing, in this case Level 1. For this event, provisioning mediator 310 will update James' SLA to allocate the associated bandwidth and latency requirements, correlate the quality of service (QoS) and define a "locked down" SLA for a block of time. Provisioning mediator 310 will also have the capability of allowing access to the mobile video and collaboration features for a limited time and then de-provision the service seamlessly once James' requirement is satisfied and the IICR is updated with a new state change.

Combining usage patterns within IICR 340 with SLAs 325 yields a higher level of customer experience and flexibility. A customer may decide for instance that a lower level of quality (e.g., 8 k voice) is sufficient for family communication as long as the call does not degrade beyond this quality and is not dropped. For this concession, the subscriber may be willing to opt into a provisioning arrangement for lower quality of service (QoS) calls for family members. This plan can be priced lower than for a higher voice quality when in voice calls with business colleagues. SLA 325 is updated based on time of day, subscriber preferences, "state change" within IICR 340, subscriber location, and any number of relevant factors evident to one skilled in the art. Because this service/application set is of such great importance to the subscriber, a premium charging scheme can be allocated for this specific block of time. After the call/video session is completed, the SLA is "torn down" and a more typical or normal SLA is invoked for the same customer.

Figure 4:
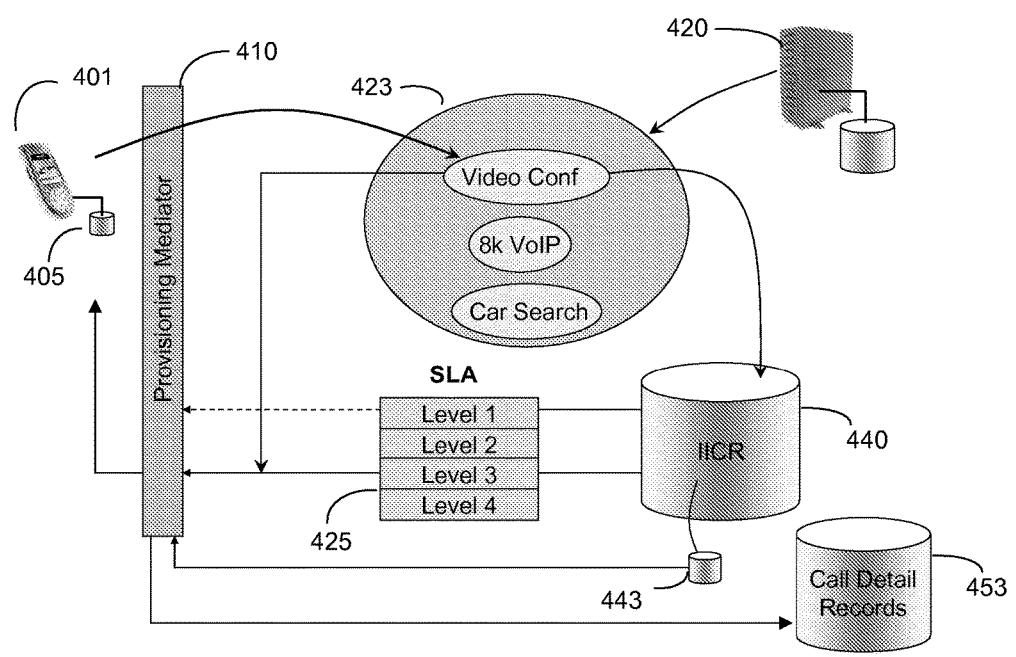
FIG. 4 shows a process for provisioning, according to an exemplary embodiment of the present invention.

FIG. 4 shows a method for provisioning, according to an exemplary embodiment of the present invention. Subscriber 401 makes a "call" or request for a specific application/service 425 to be enabled or provisioned. In this case, the application is videoconferencing. The application request is registered with the network via provisioning mediator 410. Provisioning mediator 410 is equipped with a logic unit that checks for security access and billing plan with a billing server (not shown). Provisioning mediator 410 then forwards the request onto the services access environment 423. In this environment 423 services/applications are housed which have been pre-certified for usage on the network. These services may be provided by the network operator or by a third party, as described earlier. Application servers 420 are invoked when a request is made from an active subscriber 401 having passed security and billing permissions.

If the application is available on an application server 420, a request is made to IICR 440 for subscriber profile information. If no subscriber profile information is available, a default SLA 425 is set (Level 1) based on the application developer's recommendations for usage. In the present scenario, subscriber 401 (James, again) does have profile information in IICR 440, either regarding the specific service, in this case videoconferencing, or regarding related services such as device type and bandwidth usage. Thus, there also exists a corresponding SLA 425 based on James' past usage. Level 3 of SLA 425 is more cost efficient for James as it requires less QoS and associated secured bandwidth, and seems to have been effective for him in the past. Logic within provisioning mediator 410 uses the data available via IICR 440, James' profile, and grants James access to the videoconferencing application via the Level 3 SLA. The combination is provisioned for use on James' device. An appropriate billing record of the event is also sent to the Call Detail Records (CDR) database 453 after the provisioning is verified and usage begins.

Segmentation layers within an IICR are useful tools to provide new and enhanced services to subscribers. With an IICR it is possible to a mass large amounts of data for millions of subscribers. As a result a real time assessment for optimal service levels can be made in relation to application usage. By exposing similar subscribers (who have not yet discovered these services) an increase in adoption can be achieved.

Figure 5:
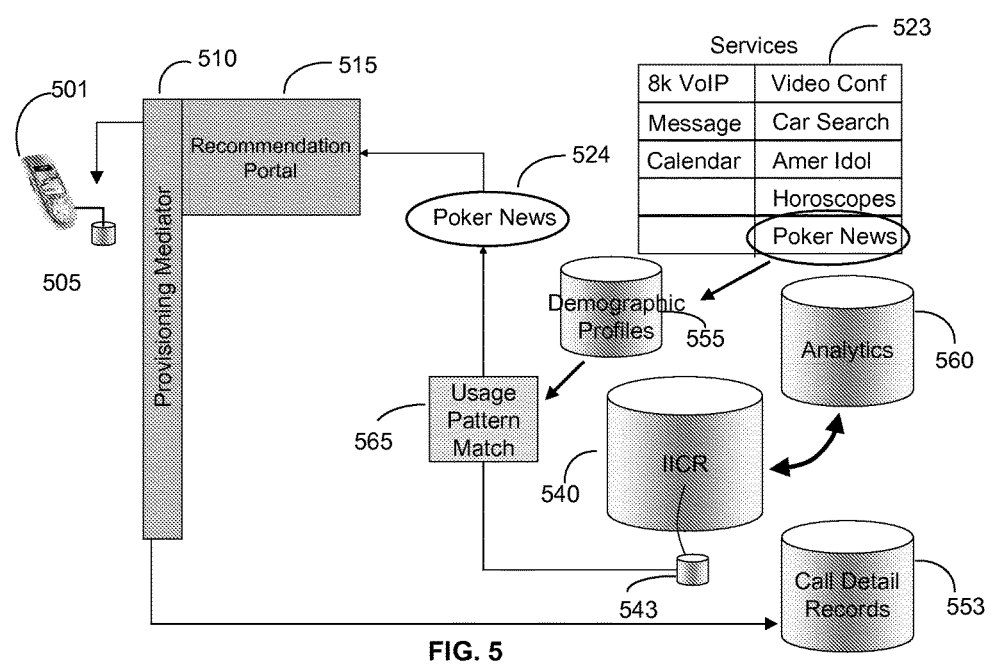
FIG. 5 shows the role of segmentation layers within the IICR according to an exemplary embodiment of the present invention.

FIG. 5 shows the role of segmentation layers within the IICR according to an exemplary embodiment of the present invention. Subscriber device 501 communicates with provisioning mediator 510 equipped with provisioning logic and a recommendation portal 515. Demographic profiles 555 and analytics engine 560 are in communication with IICR 540, which stores patterns of usage for subscriber 501 in database 543. Additionally, MIICR 505 on subscriber device 501 collects and uploads local data regarding usage, state change, and other information at the user end. Data collection is performed en masse for all subscribers in the network via IICR 540. Logic within provisioning mediator 510 communicates with demographic profiles 555 and subscriber profile 543 to find services 523 that may be relevant to a subscriber of subscriber device 501.

IICR 540 has logic that enables it to search several key fields in order to match subscriber profiles to usage patterns. For instance, within a discrete demographic (age, gender, location) a pattern of usage and even "velocity" of adoption can be obtained from existing analytics engines 560. Subscribers are mapped to these search criteria and a recommendations list is sent at some interval to them by recommendation portal 515. In the present embodiment, a subscriber of subscriber device 501, James, fits within a particular demographic profile, perhaps males between 21-35 who regularly play online poker on their devices. Surprisingly, James has not yet discovered the service "Poker News" but from the information in the IICR for his segment, there is a good chance he will enjoy it. James is "pushed" a recommendation to join the service. If he accepts the recommendation, provisioning is achieved by the network as shown in FIG. 4. Other combinations of subscriber segments and recommendations will be evident to one skilled in the art.

Figure 6:
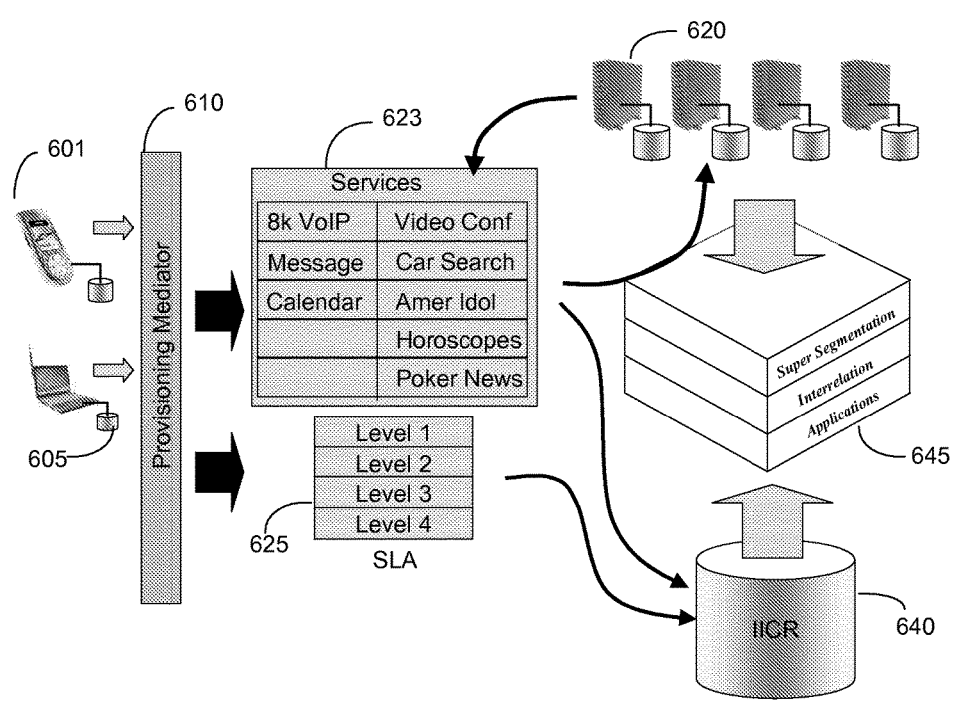
FIG. 6 shows intelligent service development using IICR segmentation layers, according to an exemplary embodiment of the present invention.

In order to create an environment in which consumers have a multiplicity of choice regarding applications which can be provisioned on the fly, developers should be able to create new applications at will. FIG. 6 shows how segmentation layers aid in development of new applications, according to an exemplary embodiment of the present invention. Subscriber devices 601, 605 are provided services via provisioning mediator 610. Applications servers 620 host services 623 at multiple service levels defined by SLAs 625. Profiles in IICR 640 are stored at several levels of detail 645. In IICR 640 resides a multi-layer correlation profiler which allows these tiered levels 645 to exist. At the top tier is the super segmentation layer. This profiling information allows the service provider a view of usage patterns based on population aggregation such as males over the age of 45 or youth ages 18-24. The next tier allows for the profiling of applications interrelation. This is the correlation of one type of application to another. For instance, a calendar application may take advantage of a messaging application in order to create alerts for meeting reminders. A narrow correlation such as "18 year-old females living in Arlington, Va. and going to Myrtle Beach, S.C. three times every summer" can be stored in a discrete profile. The more discrete the profile, the more value to the applications development community. This information can also be correlated to the SLA 625 in order to produce applications that utilize the network most efficiently, which is especially important in RF transmission as the cost of the transport is markedly more than the Wireline equivalent.

Layered view 645 can be produced to the developer 620 from IICR 640. By providing this view, a "virtual retail store" 623 can be built from the demand of subscribers 601, 605 based on the profiled information 640. By adding data such as market adoption of services and velocity of take rates, the service provider can also increase the probability of success for any given application. This then creates an intelligent feedback loop which is generated by existing service adoption, usage pattern profiling, segmentation and interrelationship of applications. Since subscribers 601, 605 will be profiled not only individually, but in correlated segments/demographics 645, the service provider can also create an arbitraged view of customer needs to the development community. In this way, the ecosystem is kept alive through a common thread of needs from consumers and enterprise customers alike.

In one exemplary embodiment, the provisioning mechanism updates subscriber's SLA in real-time, based on information currently available within the IICR (also gathered in real-time). When a subscriber's state is changed, information about this state change is reflected in the IICR. The logic unit within the provisioning mechanism monitors the IICR in real time, or at scheduled intervals, and makes changes to the subscriber's SLA based on changes in the IICR. For instance, when a data-plan subscriber switches from low-end device A to high-end device B, device information is updated in the IICR, and the provisioning mechanism automatically updates subscriber's SLA to a higher-bandwidth data plan. Additionally, patterns in this sort of behavior enable the provisioning mechanism to predict when and how the SLA is to be modified without having to constantly refer to the IICR. This allows a service provider to dedicate optimal resources of an application server to those who need them the most. This also provides for efficient billing and charging of subscribers. Instead of charging a flat rate and keeping a bit-pipe open for a subscriber whether or not the application/service is in use, resources are allocated to other subscribers and the present subscriber is billed only for his usage of the service.

Figure 7:
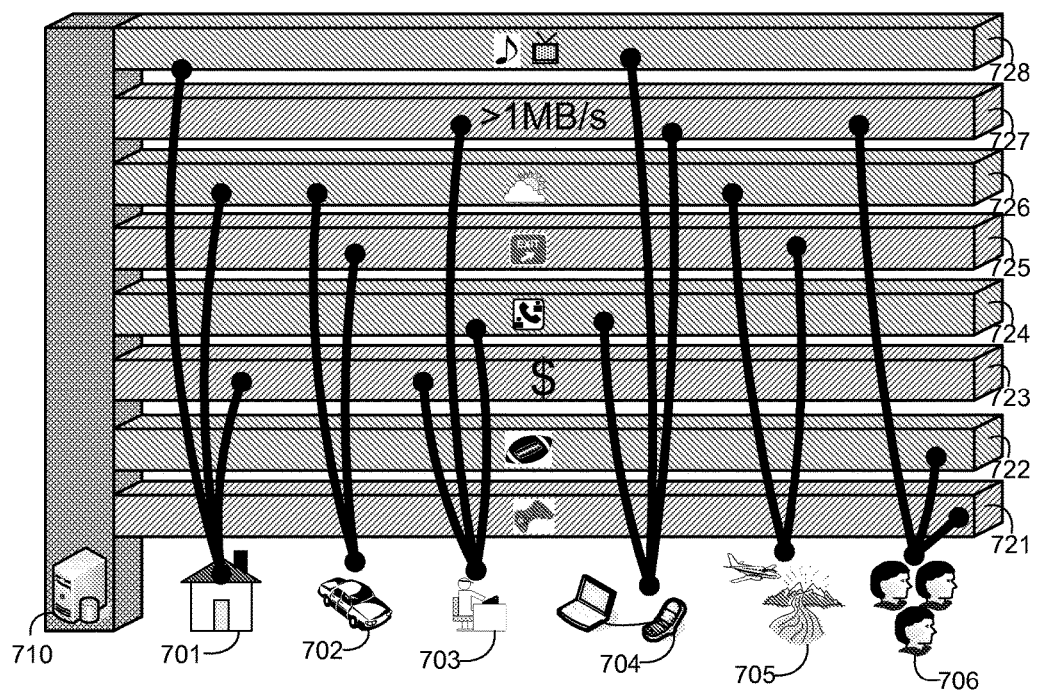
FIG. 7 shows several "use cases" wherein the real-time functionality of the present invention can be deployed, according to various exemplary embodiments of the present invention.

FIG. 7 shows several practical situations wherein this real-time functionality of the present invention can be deployed. These practical situations or "use cases" 701-706 may be situations where a single subscriber finds himself in on a day-to-day basis. For every use case, a plurality of services 721-728 is provisioned by provisioning mechanism 710. As shown in FIG. 1, provisioning mechanism 710 resides on a network in communication with application servers and the IICR. Services 721-728 may include applications, and are hosted by a server on the network. Services 721-728 may be provided by external service providers independent of a network operator. However, provisioning of services is carried out over the network. Additionally, use cases 701-706 refer to a single subscriber for the purposes of the present embodiment.

Use Case 701: Home.

When the subscriber is at home, elements on the network (not shown) provide information regarding the subscriber's location and device configuration, and this information is stored within the subscriber profile on the IICR. For instance, the subscriber may have a network link between his EVDO-enabled mobile phone, his desktop computer, home theater system, and other devices. This configuration or "state" is stored in the IICR. Additionally, the subscriber may have at one time provisioned a plurality of services to be used at home 701. These may include the ability to download multimedia 728, for instance radio podcasts or TV shows. The subscriber may have also previously provisioned a weather alert to monitor weather conditions for his backyard herb garden, or to provide alerts before leaving the house. Furthermore, the subscriber at home 701 may perform financial transactions, online banking, and budgeting at his home office. Thus, financial services 723 are provisioned. Alternatively, subscriber may have used these applications with some regularity at home for a while. These usage patterns are stored in the IICR.

In either case, provisioning mechanism 710 recognizes the subscriber's state at home, and automatically enables services 723, 726, and 728 for the subscriber's account. Other services that are not typically used at home 701 need not be enabled at this time. Provisioning mechanism 710 updates the subscriber's SLA to match the requirements of the subscriber's current usage. At home 701, this would typically be services 723, 726, and 728, based on past usage or on the subscriber's provisioning.

Use Case 702: Commute.

In the present case, the subscriber leaves his house 701 and enters his car 702 to go to work 703. Radio towers, home location registers, and other network elements not shown are able to track the position and heading of subscriber's car 702. This information is updated as a new state change in the IICR. Provisioning mechanism 710 monitors the IICR for any changes, and reflects these changes in the subscriber's SLA. These modifications could include addition or removal of multiple SLA's related to particular services. Thus, in the present case, financial services 723 and multimedia 728 are disabled, and maps/GPS navigation services 725 are enabled or provisioned.

As described herein, this provisioning may have been carried out by the subscriber himself at an earlier time, or it may have been provisioned into the SLA based on past use by the subscriber. The subscriber in car 702 may have, upon initially setting up service, selected multimedia music/radio services 728 and weather services 726 to be provisioned whenever he commutes to work. However, over time, say a period of 3 months, the subscriber never listened to music on the way to work. However, he did check the weather, and on more than one occasion he pulled up mapping software such as Google Maps, or attempted to access a GPS or A-GPS (Assisted GPS) navigation service 725 without actually provisioning it or purchasing a plan. Usage information for these applications is updated in real-time in the IICR. When provisioning mechanism 710 observes these patterns, it looks up the subscriber's SLA and modifies the SLA accordingly, such that the music service is removed, and the mapping service is enabled. This can of course be prompted to the subscriber first for his own approval. However, it is a purpose of the present invention to automate these tasks to provide optimal usage of network resources while at the same time maintaining customer satisfaction by providing relevant services while keeping bills low.

Use Case 703: Office.

The present invention is also useful to provide different levels of service to a single subscriber depending on a home or business environment. The subscriber gets to work, sits down at his desk, and his state change is updated in the IICR. At work, the subscriber may require that calls from his device be forwarded to a desk phone. Additionally, the subscriber may have used teleconferencing functionalities at work to communicate with co-workers. Thus, a plurality of telephony services 724 may be provisioned when the subscriber is at work 703. Additionally, there may be a need for videoconferencing between branches of the office or with clients. This advanced business-level functionality is provisioned by enabling broadband services 727. These may include enabling a plurality of high-speed protocols as well as allowing the subscriber's device access to network elements that support these protocols, such as live streaming servers and multicast nodes.

Since this type of provisioning dynamically distinguishes between personal use and business use, there are benefits to corporate users of telecommunications services. A company who provides an employee with a mobile service may save a lot of money by having high-bandwidth business-level SLA's deactivated when the employee is not sitting at his desk. Alternate configurations are of course possible.

Use Case 704: Mobile Office.

The subscriber has left work and is now sitting at a coffee shop, train station, or awaiting a flight at an airport. Whatever the case may be, he is still conducting business and has connected or "tethered" 704 his mobile phone to his laptop computer, thereby using it as a modem. Given this scenario, it may be evident that the subscriber is about to perform some power browsing or other similar services. Thus, based on either the subscriber's provisioning or simply his past usage, provisioning mechanism 710 invokes the IICR and SLA, and provisions high-bandwidth 727, multimedia 728, and telephony services 724. This configuration may be one that the subscriber has used in the past while tethering 704, and is therefore optimal for the subscriber's needs at the time.

Use Case 705:

Traveling/roaming. The subscriber gets on his flight to go snowboarding in the mountains of West Virginia. Since there may be no regular service in the mountains of West Virginia, there is a good chance that the subscriber is using the towers of another, probably inferior network operator. Thus, certain high-end services such as broadband 727, media downloads 728, banking 723, etc. are disabled or not provided. Alternatively, the subscriber may have manually disabled these services while in West Virginia simply because in the past they have cost too much to activate while roaming. However, the subscriber may still need the use of mapping and driving directions 725, as well as weather reports 726 to check driving and slope conditions. Thus, whether the subscriber has provisioned these or has simply used them in similar situations in the past, these services will be enabled.

Use Case 706: Interest Groups.

Regardless of physical location or time of day, there may be situations when the subscriber requires the use of certain services that are shared with a larger subscriber segment. For instance, the subscriber may be part of a Fantasy Football™ team with a group of friends 706. The application may be installed on the subscriber's device and is hosted on a Fantasy Football application server on the network. Throughout the year this service remains dormant and unprovisioned, that is until the playoffs begin. At this point, based on past activity of the subscriber and group 706, this service may be enabled and their team reactivated. The subscriber may be required to confirm enabling of this service. Another example is online gaming 721. On weekends, the subscriber may get together with some friends for a new electronic trivial pursuit game 721 that is hosted by an application server and is accessible via the subscriber's and group's 706 devices. Additionally, playing multiplayer games 721 may require a broadband connection 727. Thus, these services are enabled for special-interest groups based on their usage history of the special-interest applications.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    tracking, by a provisioning mediator that comprises a processor, movements and usage of a mobile device over time, wherein the mobile device is associated with a subscriber, and wherein the usage comprises home usage of a first plurality of services at a first location that corresponds to a home, office usage of a second plurality of services at a second location that corresponds to an office, and third usage of a third plurality of services during a commute of the subscriber between the home and the office;
    determining, by the provisioning mediator, a usage pattern for the subscriber based on the movements and the usage, wherein the usage pattern indicates a first time of day during which the first plurality of services was used when the mobile device was located at the home, wherein the usage pattern further indicates a second time of day during which the second plurality of services was used when the mobile device was located at the office, and wherein the usage pattern indicates a third time of day during which the third plurality of services was used during the commute of the subscriber between the home and the office;
    storing, by the provisioning mediator, subscriber profile information associated with the subscriber, wherein the subscriber profile information indicates the usage pattern at the home, the office, and during the commute;
    determining, by the provisioning mediator, where the mobile device is located and a current time of day;
    obtaining, by the provisioning mediator, the subscriber profile information;
    determining, by the provisioning mediator and based on the subscriber profile information, an expected length of time for which the subscriber will access services based on where the mobile device is located and the current time of day, wherein the services comprise one of the first plurality of services, the second plurality of services, or the third plurality of services;
    determining, by the provisioning mediator, a quality of service needed for the services during the expected length of time, wherein the expected length of time corresponds to one of the first time of day, the second time of day, or the third time of day;
    correlating, by the provisioning mediator, the usage pattern for the subscriber to an optimal service level agreement of a plurality of service level agreements stored at a service level agreement database, wherein the optimal service level agreement specifies the quality of service for the services and the expected length of time for which the services are to be provisioned; and
    initiating, by the provisioning mediator, provisioning of the services at the quality of service and for the expected length of time, wherein initiating the provisioning comprises initiating a modification of a service level agreement associated with the subscriber, whereby the subscriber is granted access to the services for the expected length of time, and wherein the services are de-provisioned after the expected length of time, whereby service is optimized by modifying the service level agreement based on current location, and whereby the subscriber is billed for the services only for the expected length of time.

2. The method of claim 1, wherein the service level agreement database stores:
    first records that relate to expected service levels and expected quality of service for the subscriber; and
    second records that relate to actual service levels and actual quality of service for the sub scriber.

3. The method of claim 1, further comprising:
    identifying a plurality of subscribers having usage patterns that are similar to the usage pattern for the subscriber; and
    providing the services to the plurality of subscribers.

4. The method of claim 1, wherein modifying the service level agreement comprises tearing down the service level agreement and replacing the service level agreement with a new service level agreement.

5. The method of claim 1, wherein modifying the service level agreement comprises adding a new service level agreement associated with the services.

6. The method of claim 1, wherein the service level agreement database stores:
   first records that relate to expected service levels and expected quality of service for the subscriber; and
   second records that relate to actual service levels and actual quality of service for the subscriber.

7. The method of claim 1, further comprising:
   determining, by the provisioning mediator, that the mobile device is located at the second location; and
   initiating, by the provisioning mediator, provisioning of the second plurality of services for a second expected length of time.

8. The method of claim 7, wherein initiating provisioning of the second plurality of services comprises initiating de-provisioning of the services.

9. The method of claim 1, further comprising:
   predicting, by the provisioning mediator, that the subscriber needs the second plurality of services; and
   initiating, by the provisioning mediator, provisioning of the second plurality of services for a second expected length of time.

10. The method of claim 1, further comprising:
    determining, by the provisioning mediator, that the mobile device has left the first location and is located at the second location;
    initiating, by the provisioning mediator, de-provisioning of the first plurality of services; and
    initiating, by the provisioning mediator, provisioning of the third plurality of services for a second expected length of time.

11. A non-transitory computer-readable medium that stores instructions that, when executed by a processor, cause the processor to perform operations comprising:
    tracking, by a provisioning mediator that comprises the processor, movements and usage of a mobile device over time, wherein the mobile device is associated with a subscriber, and wherein the usage comprises home usage of a first plurality of services at a first location that corresponds to a home, second usage of a second plurality of services at a second location that corresponds to an office, and third usage of a third plurality of services during a commute of the subscriber between the home and the office;
    determining, by the provisioning mediator, a usage pattern for the subscriber based on the movements and the usage, wherein the usage pattern indicates a first time of day during which the first plurality of services was used when the mobile device was located at the home, wherein the usage pattern further indicates a second time of day during which the second plurality of services was used when the mobile device was located at the office, and wherein the usage pattern indicates a third time of day during which the third plurality of services was used during the commute of the subscriber between the home and the office;
    storing, by the provisioning mediator, subscriber profile information associated with the subscriber, wherein the subscriber profile information indicates the usage pattern at the home, the office, and during the commute;
    determining, by the provisioning mediator, where the mobile device is located and a current time of day;
    obtaining, by the provisioning mediator, the subscriber profile information;
    determining, by the provisioning mediator and based on the subscriber profile information, an expected length of time for which the subscriber will access services based on where the mobile device is located and the current time of day, wherein the services comprise one of the first plurality of services, the second plurality of services, or the third plurality of services;
    determining, by the provisioning mediator, a quality of service needed for the services during the expected length of time, wherein the expected length of time corresponds to one of the first time of day, the second time of day, or the third time of day;
    correlating, by the provisioning mediator, the usage pattern for the subscriber to an optimal service level agreement of a plurality of service level agreements stored at a service level agreement database, wherein the optimal service level agreement specifies the quality of service for the services and the expected length of time for which the services are to be provisioned; and
    initiating, by the provisioning mediator, provisioning of the services at the quality of service and for the expected length of time, wherein initiating the provisioning comprises initiating a modification of a service level agreement associated with the subscriber, whereby the subscriber is granted access to the services for the expected length of time, and wherein the services are de-provisioned after the expected length of time, whereby service optimized by modifying the service level agreement based on current location, and whereby the subscriber is billed for the services only for the expected length of time.

12. The non-transitory computer-readable medium of claim 11, wherein the service level agreement database stores:
    first records that relate to expected service levels and expected quality of service for the subscriber; and
    second records that relate to actual service levels and actual quality of service for the subscriber.

13. The non-transitory computer-readable medium of claim 12, wherein the instructions, when executed by the processor, cause the processor to perform operations further comprising:
    identifying a plurality of subscribers having usage patterns that are similar to the usage pattern for the subscriber; and
    providing the services to the plurality of subscribers.

14. The non-transitory computer readable medium of claim 11, wherein modifying the service level agreement comprises tearing down the service level agreement and replacing the service level agreement with a new service level agreement.

15. The non-transitory computer-readable medium of claim 11, wherein modifying the service level agreement comprises adding a new service level agreement associated with the first plurality of services.

16. A system comprising:
    a processor; and
    a memory that stores instructions that, when executed by the processor, cause the processor to perform operations comprising
      tracking, by a provisioning mediator that comprises the processor, movements and usage of a mobile device over time, wherein the mobile device is associated with a subscriber, and wherein the usage comprises home usage of a first plurality of services at a first location that corresponds to a home, office usage of a second plurality of services at a second location that corresponds to an office, and third usage of a third plurality of services during a commute of the subscriber between the home and the office, determining, by the provisioning mediator, a usage pattern for the subscriber based on the movements and the usage, wherein the usage pattern indicates a first time of day during which the first plurality of services was used when the mobile device was located at the home, wherein the usage pattern further indicates a second time of day during which the second plurality of services was used when the mobile device was located at the office, and wherein the usage pattern indicates a third time of day during which the third plurality of services was used during the commute of the subscriber between the home and the office, storing, by the provisioning mediator, subscriber profile information associated with the subscriber, wherein the subscriber profile information indicates the usage pattern at the home, the office, and during the commute, determining, by the provisioning mediator, where the mobile device is located and a current time of day, obtaining, by the provisioning mediator, the subscriber profile information, determining, by the provisioning mediator and based on the subscriber profile information, an expected length of time for which the subscriber will access services based on where the mobile device is located and the current time of day, wherein the services comprise one of the first plurality of services, the second plurality of services, or the third plurality of services, determining, by the provisioning mediator, a quality of service needed for the services during the expected length of time, wherein the expected length of time corresponds to one of the first time of day, the second time of day, or the third time of day, correlating, by the provisioning mediator, the usage pattern for the subscriber to an optimal service level agreement of a plurality of service level agreements stored at a service level agreement database, wherein the optimal service level agreement specifies the quality of service for the services and the expected length of time for which the services are to be provisioned, and initiating, by the provisioning mediator, provisioning of the services at the quality of service and for the expected length of time, wherein initiating the provisioning comprises initiating a modification of a service level agreement associated with the subscriber, whereby the subscriber is granted access to the services for the expected length of time, and wherein the services are de-provisioned after the expected length of time, whereby service is optimized by modifying the service level agreement based on current location, and whereby the subscriber is billed for the services only for the expected length of time.

17. The system of claim 16, wherein modifying the service level agreement comprises tearing down the service level agreement and replacing the service level agreement with a new service level agreement.

18. The system of claim 16, wherein modifying the service level agreement comprises adding a new service level agreement associated with the first plurality of services.

\* \* \* \* \*